US012525411B2

(12) United States Patent
Hu et al.

(10) Patent No.: US 12,525,411 B2
(45) Date of Patent: Jan. 13, 2026

(54) SOLID-STATE CIRCUIT BREAKER

(71) Applicant: Schneider Electric (China) Co., Ltd., Beijing (CN)

(72) Inventors: Yang Hu, Shanghai (CN); Zhigang Han, Shanghai (CN)

(73) Assignee: Schneider Electric (China) Co. Ltd., Beijing (CN)

( * ) Notice: Subject to any disclaimer, the term of this patent is extended or adjusted under 35 U.S.C. 154(b) by 149 days.

(21) Appl. No.: 18/520,374

(22) Filed: Nov. 27, 2023

(65) Prior Publication Data

US 2025/0029795 A1 Jan. 23, 2025

(30) Foreign Application Priority Data

Jul. 19, 2023 (CN) ........................ 202310892364.4

(51) Int. Cl.
*H01H 9/54* (2006.01)
*H01H 73/04* (2006.01)
*H01H 73/18* (2006.01)

(52) U.S. Cl.
CPC ............ *H01H 9/542* (2013.01); *H01H 73/04* (2013.01); *H01H 73/18* (2013.01)

(58) Field of Classification Search
CPC ........ H01H 1/2058; H01H 9/54; H01H 9/542; H01H 9/547; H01H 71/027; H01H 71/0235; H01H 71/025; H01H 71/1009; H01H 71/52; H01H 71/58; H01H 73/04; H01H 73/18
USPC ........................................................... 361/13
See application file for complete search history.

(56) References Cited

U.S. PATENT DOCUMENTS

2017/0358403 A1* 12/2017 Zhou ...................... H01H 9/542

FOREIGN PATENT DOCUMENTS

| | | | | |
|---|---|---|---|---|
| CN | 104362055 A * | 2/2015 | ............ H01H 73/04 |
| EP | 0538149 A1 | 4/1993 | |
| WO | 0167473 A2 | 9/2001 | |

OTHER PUBLICATIONS

Machine translation of Lin et al. Chinese Patent Document CN 104362055 A Feb. 2015 (Year: 2015).*

* cited by examiner

*Primary Examiner* — Kevin J Comber
(74) *Attorney, Agent, or Firm* — Kinney & Lange, P.A.

(57) ABSTRACT

The present disclosure discloses a solid-state circuit breaker, a mechanical breakpoint of the solid-state circuit breaker adopts a modular layout, which includes: a housing module; a breaking unit module including a stationary contact and a movable contact; a mechanism module configured to drive an action of the breaking unit module; and a transmission module, configured to connect the mechanism module and the breaking unit module, wherein the housing module, the mechanism module, the breaking unit module and the transmission module are independent from each other and are able to be installed and disassembled from each other. The solid-state circuit breaker according to the present disclosure is modularized, the installation process is simple, the switching of different application requirements is facilitated, and the maintenance and replacement of internal components are more convenient.

12 Claims, 3 Drawing Sheets

SOLID-STATE CIRCUIT BREAKER

TECHNICAL FIELD

The present disclosure relates to a solid-state circuit breaker, and a method for installing the solid-state circuit breaker.

BACKGROUND

Solid-state circuit breaker controls the opening and closing of a circuit through the principle of an electronic device. Because of its advantages of short breaking time, no electric arc during breaking, long electrical life and no noise, the solid-state circuit breaker is suitable for various applications of AC and DC. The standard requires that solid-state circuit breaker that meet the isolation conditions needs a mechanical breakpoint. At present, the mechanical breakpoints of the solid-state circuit breakers all have an integrated structure, that is, stationary contact and the movable contact, operation handle, etc. are inseparable and directly installed in the same housing, which is not conducive to the switching of different application requirements (AC/DC, different numbers of stages), nor to the maintenance and replacement of internal components.

SUMMARY

With regard to the abovementioned problems, according to a first aspect of the present disclosure, a solid-state circuit breaker is provided, which is characterized in that a mechanical breakpoint of the solid-state circuit breaker adopts a modular layout, which includes:

- a housing module, forming a cavity for accommodating components of the solid-state circuit breaker;
- a breaking unit module, installed in the housing module and comprising a stationary contact fixed to the housing module and a movable contact being movable relative to the stationary contact to realize a connection and a disconnection of a circuit;
- a mechanism module, installed in the housing module and configured to drive an action of the breaking unit module; and
- a transmission module, configured to connect the mechanism module and the breaking unit module, so that a motion of a moving component in the mechanism module can be transmitted to the movable contact of the breaking unit module,
- wherein the housing module, the mechanism module, the breaking unit module and the transmission module are independent from each other and are able to be installed and disassembled from each other.

Because the solid-state circuit breaker according to the present disclosure is modularized, its installation process is simple. Moreover, upon different solid-state circuit breakers being installed, only the corresponding modules need to be selected according to, for example, the stages and AC/DC applications, and the installation steps and methods remain unchanged, so it is very beneficial to the switching of different application requirements (AC/DC, different numbers of stages). In addition, due to the modularization, the maintenance and replacement of internal components are more convenient.

The solid-state circuit breaker according to the present disclosure may include one or more features provided in the following.

According to an embodiment, the breaking unit module comprises one or more breaking units, and each of the breaking units comprises a stationary contact and a corresponding movable contact.

According to an embodiment, the solid-state circuit breaker varies according to a number of stages, and a number of breaking units of the breaking unit module depends on the number of stages being adapted.

According to an embodiment, the solid-state circuit breaker varies according to an AC application and a DC application.

According to an embodiment, upon the solid-state circuit breaker being used for a DC application, compared with an AC application, an arc extinguishing grid is arranged in the breaking unit module.

According to an embodiment, the transmission module is a transmission shaft, and is configured to connect the moving component of the mechanism module to the movable contact of the breaking unit module so as to transmit motion.

According to an embodiment, the mechanism module comprises an operation handle, the operation handle is configured to be actuated to drive the moving component to move to realize opening and closing.

According to an embodiment, the modular layout of the solid-state circuit breaker is suitable for UL products and IEC products.

According to a second aspect of the present disclosure, a method for installing the solid-state circuit breaker as described above is provided, and includes the following steps:

1) installing one breaking unit of the breaking unit module to the mechanism module;
2) installing the transmission module to connect the mechanism module and the breaking unit module;
3) installing the mechanism module, the breaking unit module and the transmission module which are assembled with each other to the housing module.

The solid-state circuit breaker according to the present disclosure adopts the modular layout, and the installation process is simple, which is very conductive to the switching of different application requirements (AC/DC and different numbers of stages).

The method for installing the abovementioned solid-state circuit breaker according to the present disclosure may include one or more features provided in the following.

According to an embodiment, the breaking unit module comprises more than one breaking unit, and other breaking units are installed between step 2) and step 3).

According to an embodiment, step 1) further comprises installing a connection fixing component, configured to fix a fixed part of the breaking unit module and a fixed part of the mechanism module.

According to an embodiment, in step 2), the transmission module connects the moving component of the mechanism module and the movable contact of the breaking unit module.

BRIEF DESCRIPTION OF DRAWINGS

In order to describe the technical solution of the embodiments of the present disclosure more clearly, the accompanying drawings of the embodiments of the present disclosure will be briefly introduced below. The accompanying drawings are only used to show some embodiments of the present disclosure, and are not used to limit all embodiments of the present disclosure.

LIST OF REFERENCE NUMERALS

Figure 1:
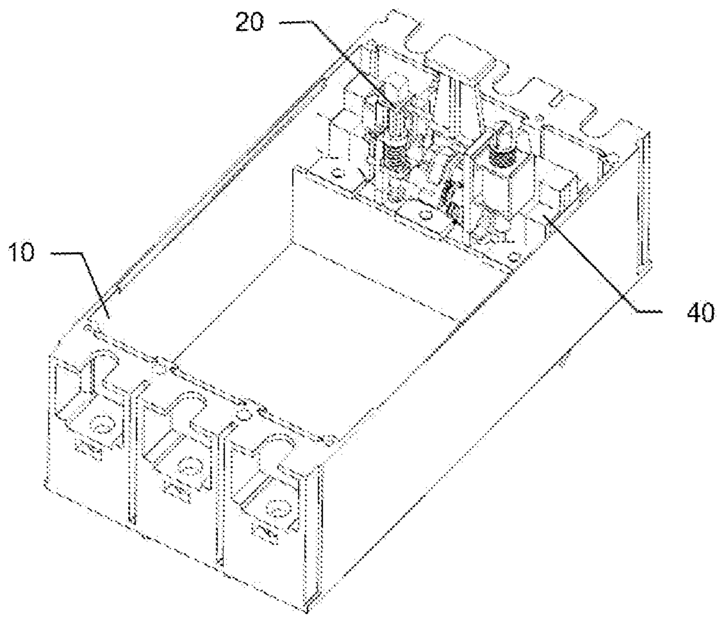
FIG. 1 is a schematic diagram of a solid-state circuit breaker according to the present disclosure.

10—housing module
20—mechanism module
30—transmission module
40—breaking unit module
41—arc extinguishing grid

DETAILED DESCRIPTION

In order to make the purpose, technical solution and advantages of the technical solution of the present disclosure more clear, the technical solution of the embodiment of the present disclosure will be described clearly and completely with reference to the accompanying drawings of specific embodiments of the present disclosure. The same reference numerals in the drawings represent the same parts. It should be noted that the described embodiment is a part of the embodiment of the present disclosure, not the whole embodiment. Based on the described embodiments of the present disclosure, all other embodiments obtained by those skilled in the field without creative labor belong to the protection scope of the present disclosure.

Unless otherwise defined, technical terms or scientific terms used herein shall have their ordinary meanings as understood by people with ordinary skills in the field to which this invention belongs. The words "first", "second" and similar words used in the specification and claims of the patent application of the present invention do not indicate any order, quantity or importance, but are only used to distinguish different components. Similar words such as "including" or "containing" mean that the elements or objects appearing before the word cover the elements or objects listed after the word and their equivalents, without excluding other elements or objects. Similar words such as "connect" or "connected" are not limited to physical or mechanical connection, but can include electrical connection, whether direct or indirect. "Up", "Down", "Left" and "Right" are only used to indicate the relative positional relationship. When the absolute position of the described object changes, the relative positional relationship may also change accordingly.

Hereinafter, the present disclosure will be described in detail below by describing example embodiments.

As illustrated by FIG. 1, a mechanical breakpoint of a solid-state circuit breaker according to the present disclosure adopt a modular layout. Specifically, the solid-state circuit breaker according to the present disclosure may include a housing module 10, a breaking unit module 40, a mechanism module 20, and a transmission module 30.

Figure 2:
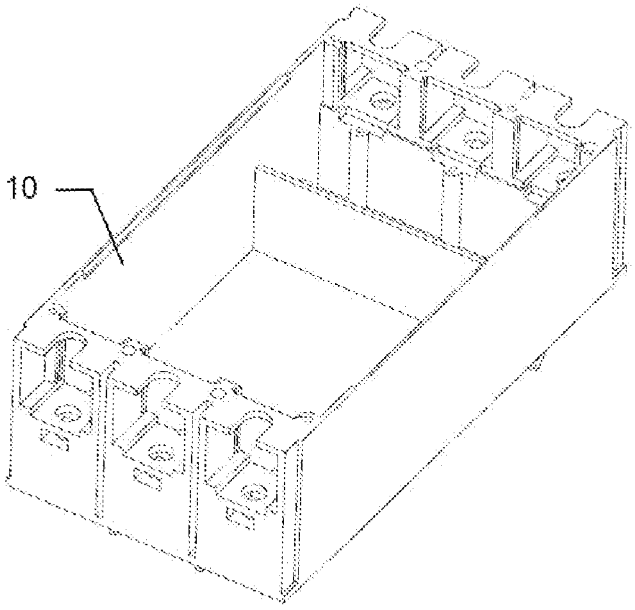
FIG. 2 is a schematic diagram of a housing module of a solid-state circuit breaker according to the present disclosure.

FIG. 2 is a schematic diagram of a housing module 10 of a solid-state circuit breaker according to the present disclosure. As illustrated by FIG. 2, the housing module 10 forms a cavity for accommodating components of the solid-state circuit breaker, such as the breaking unit module 40, the mechanism module 20, and the transmission module 30, and the components of the solid-state circuit breaker may also include other components.

Figure 5:
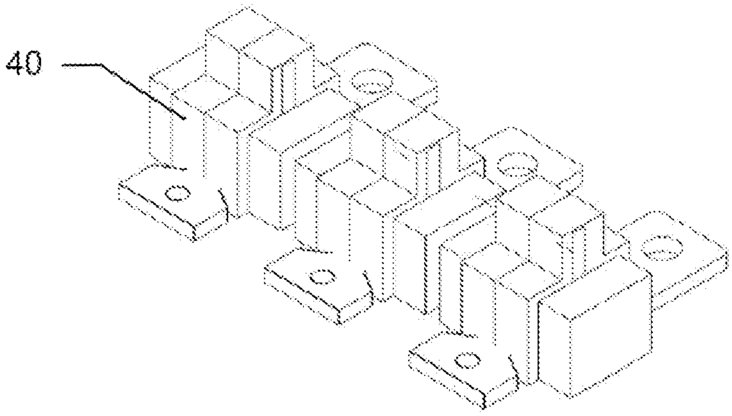
FIG. 5 is a schematic diagram of the breaking unit module of a solid-state circuit breaker according to the present disclosure.

FIG. 5 is a schematic diagram of a breaking unit module 40 of a solid-state circuit breaker according to the present disclosure. The breaking unit module 40 is installed in the housing module 10, and includes a stationary contact fixed to the housing module 10 and a movable contact being movable relative to the stationary contact to realize a connection and a disconnection of a circuit. The breaking unit module 40 may include one or more breaking units, and each of the breaking units includes a stationary contact and a corresponding movable contact.

Figure 3:
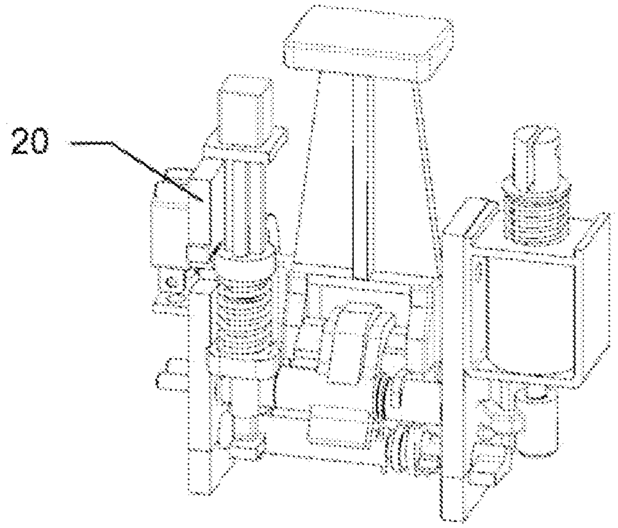
FIG. 3 is a schematic diagram of a mechanism module of a solid-state circuit breaker according to the present disclosure.

FIG. 3 is a schematic diagram of a mechanism module 20 of a solid-state circuit breaker according to the present disclosure. The mechanism module 20 is installed in the housing module 10 and configured to drive an action of the breaking unit module 40. The mechanism module 20 may include an operation handle, the operation handle is configured to be actuated to drive a moving component of the mechanism module 20 to move. The mechanism module 20 may also include a bracket, a connection rod for buckling, a microswitch for capturing a position of the mechanism, an electromagnet for electric operation, and the like. The mechanism module 20 is used to realize the functions of opening, closing and tripping.

Figure 4:
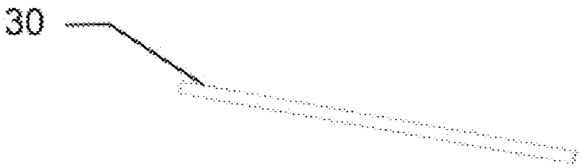
FIG. 4 is a schematic diagram of a transmission module of a solid-state circuit breaker according to the present disclosure.

FIG. 4 is a schematic diagram of a transmission module 30 of a solid-state circuit breaker according to the present disclosure. The transmission module 30 is configured to connect the mechanism module 20 and the breaking unit module 40, so that the motion of the moving component in the mechanism module 20 can be transmitted to the movable contact of the breaking unit module 40. The transmission module 30 is, for example, a transmission shaft.

The housing module 10, the mechanism module 20, the breaking unit module 40 and the transmission module 30 are independent from each other, that is, they can be independent modules and separated from other modules. The housing module 10, the mechanism module 20, the breaking unit module 40 and the transmission module 30 can be installed and disassembled from each other. After installation, upon the operation handle of the mechanism module 20 being actuated, the moving component of the mechanism module 20 moves with the mechanism module 20, and the motion of the moving component is transmitted to the movable contact of the breaking unit module 40 through the transmission module 30, and the movable contact acts to engage or disengage with the corresponding stationary contact, thus realizing the connection and disconnection of the circuit.

The solid-state circuit breaker according to the present disclosure adopts a modular layout, especially the modular layout of the breakpoint, which can be varied according to the number of stages, and varied according to an AC application and a DC application, and is suitable for UL products and IEC products.

Figure 6:
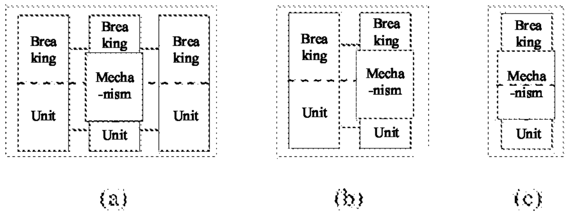
FIG. 6 is a schematic diagram showing that a solid-state circuit breaker according to the present disclosure is switched between different numbers of stages.

The modular layout of the breakpoint can facilitate the quick switching of different numbers of stages in different application scenarios, as illustrated by FIG. 6. For example, the solid-state circuit breaker according to the present disclosure can switch to an appropriate number of stages according to the rated voltage in a DC application, and the number of breaking units of the breaking unit module 40 depends on the number of stages as adapted, the number of stages is 3 in FIG. 6(*a*), and the number of the breaking units is 3; the number of stages is 2 in FIG. 6(*b*), and the number of the breaking units is 2; the number of stages is 1 in FIG. 6(*c*), and the number of the breaking units is 1.

Figure 7:
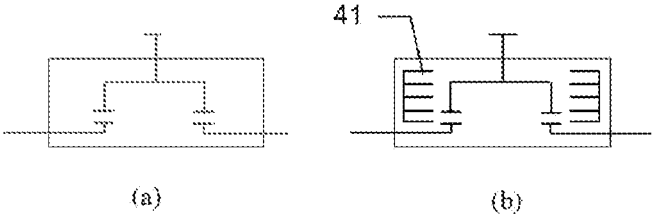
FIG. 7 is a schematic diagram showing that a solid-state circuit breaker according to the present disclosure is switched between an AC application and a DC application.

The modular layout can facilitate quick switching between an AC application and a DC application. For example, as illustrated by FIG. 7, upon the solid-state circuit breaker being used in (b) DC application, compared with (a) AC application, the breaking unit of the breaking unit module 40 is provided with an arc extinguishing grid 41, and only the arc extinguishing grid 41 needs to be added without changing other modules.

The modular layout can also facilitate quick switching between UL products and IEC products.

Figure 8:
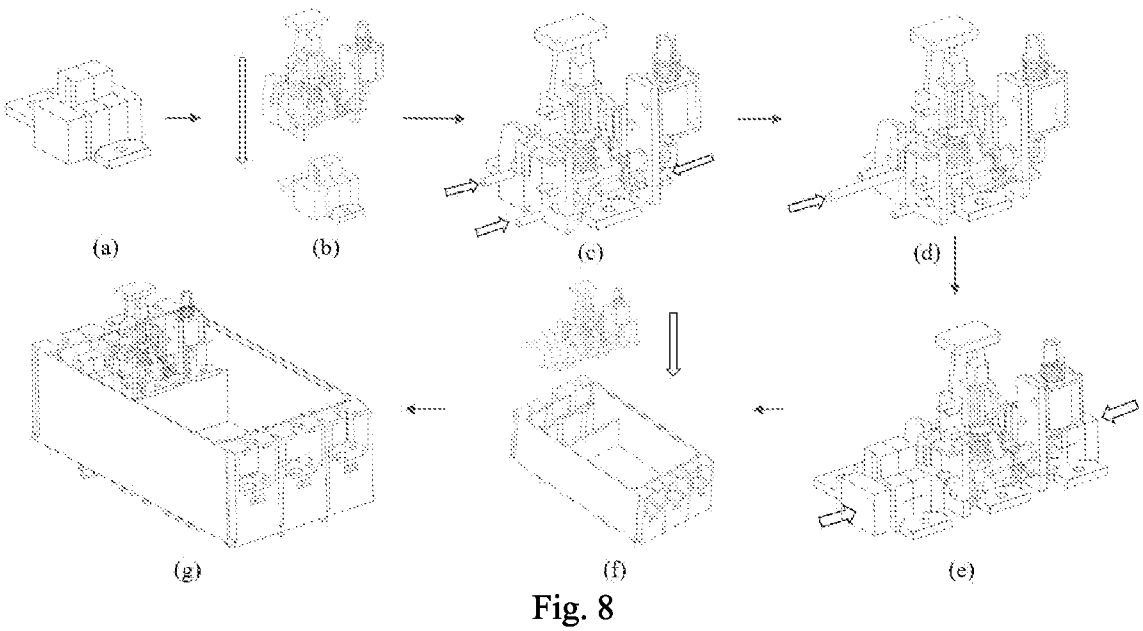
FIG. 8 is a schematic diagram showing an installation process of a solid-state circuit breaker according to the present disclosure.

According to one embodiment of the solid-state circuit breaker of the present disclosure, an installation process of modules is shown in FIG. 8. The specific steps are as provided as follows:

(a) preparing one breaking unit of the breaking unit module 40;

(b) installing the one breaking unit of the breaking unit module 40 to the mechanism module 20;

(c) installing a connection fixing component to fix a fixed part of the breaking unit of the breaking unit module 40 and a fixed part of the mechanism module 20;

(d) installing the transmission module 30 to connect the moving component of the mechanism module 20 and the movable contact of the one breaking unit of the breaking unit module 40;

(e) installing other breaking units of the breaking unit module 40;

(f) installing the mechanism module 20, the breaking unit module 40 and the transmission module 30 which are assembled with each other to the housing module 10;

(g) installation is completed.

Among them, step (e) is not necessary, and step (e) can be omitted in that case the number of stage of the solid-state circuit breaker is 1 and the breaking unit module 40 only includes one breaking unit. In the embodiment shown in FIG. 8, the connection fixing component shown in step (c) is pins installed from both sides, but the embodiments of the present disclosure are not limited thereto, and other fixing methods can be envisaged. In the embodiment shown in FIG. 8, the transmission module 30 shown in step (d) is a transmission shaft, but the embodiments of the present disclosure are not limited thereto, and other transmission modes can be envisaged. Step (e) includes assembling the transmission module 30 with the movable contacts of other breaking units, so that the motion of the moving component of the mechanism module 20 is transmitted to the movable contacts of all breaking units through the transmission module 30.

Because the solid-state circuit breaker according to the present disclosure is modularized, its installation process is simple. Moreover, upon different solid-state circuit breakers being installed, only the corresponding modules need to be selected according to, for example, the stages and AC/DC applications, and the installation steps and methods remain unchanged, so it is very conductive to the switching of different application requirements (AC/DC, different numbers of stages). In addition, due to the modularization, the maintenance and replacement of internal components are more convenient.

The exemplary embodiments of the solid-state circuit breaker and the method for installing the solid-state circuit breaker provided by the present disclosure have been described in detail above with reference to the preferred embodiments. However, those skilled in the art can understand that various variations and modifications can be made to the above specific embodiments without departing from the concept of the present disclosure, and various technical features and structures provided by the present disclosure can be combined in various ways without exceeding the protection scope of the present disclosure.

The invention claimed is:

1. A solid-state circuit breaker, which is characterized in that a mechanical breakpoint of the solid-state circuit breaker adopts a modular layout, comprising:

a housing module, forming a cavity for accommodating components of the solid-state circuit breaker;

a breaking unit module, installed in the housing module and comprising a stationary contact fixed to the housing module and a movable contact being movable relative to the stationary contact to realize a connection and a disconnection of a circuit;

a mechanism module, installed in the housing module and configured to drive an action of the breaking unit module; and a transmission module, configured to connect the mechanism module and the breaking unit module, so that a motion of a moving component in the mechanism module is configured to be transmitted to the movable contact of the breaking unit module, wherein the housing module, the mechanism module, the breaking unit module and the transmission module are independent from each other and are configured to be installed and disassembled from each other.

2. The solid-state circuit breaker according to claim 1, wherein the breaking unit module comprises one or more breaking units, and each of the breaking units comprises a stationary contact and a corresponding movable contact.

3. The solid-state circuit breaker according to claim 2, wherein the solid-state circuit breaker varies according to a number of stages, and a number of breaking units of the breaking unit module depends on the number of stages being adapted.

4. The solid-state circuit breaker according to claim 1, wherein the solid-state circuit breaker varies according to an AC application and a DC application.

5. The solid-state circuit breaker according to claim 1, wherein, upon the solid-state circuit breaker being used for a DC application, compared with an AC application, an arc extinguishing grid is arranged in the breaking unit module.

6. The solid-state circuit breaker according to claim 1, wherein the transmission module is a transmission shaft, and is configured to connect the moving component of the mechanism module to the movable contact of the breaking unit module so as to transmit motion.

7. The solid-state circuit breaker according to of claim 1, wherein the mechanism module comprises an operation handle, the operation handle is configured to be actuated to drive the moving component to move to realize opening and closing.

8. The solid-state circuit breaker according to claim 1 wherein the modular layout of the solid-state circuit breaker is suitable for UL products and IEC products.

9. A method for installing the solid-state circuit breaker according to claim 1, comprising following steps:

1) Installing one breaking unit of the breaking unit module to the mechanism module;
2) Installing the transmission module to connect the mechanism module and the breaking unit module;
3) Installing the mechanism module, the breaking unit module and the transmission module which are assembled with each other to the housing module.

10. The method according to claim 9, wherein the breaking unit module comprises more than one breaking unit, and other breaking units are installed between step 2) and step 3).

11. The method according to claim 9, wherein step 1) further comprises installing a connection fixing component, configured to fix a fixed part of the breaking unit module and a fixed part of the mechanism module.

12. The method according to claim 9, wherein, in step 2), the transmission module connects the moving component of the mechanism module and the movable contact of the breaking unit module.

* * * * *